United States Patent [19]

Stewart

[11] Patent Number: 4,744,646
[45] Date of Patent: May 17, 1988

[54] PLASTIC EYEGLASS FRAMES

[76] Inventor: Saleta Stewart, 130 Cuttermill Rd., Great Neck, N.Y. 11022

[21] Appl. No.: 849,855

[22] Filed: Apr. 9, 1986

[51] Int. Cl.[4] .......................... G02C 5/14; G02C 5/22
[52] U.S. Cl. ..................................... 351/153; 351/121
[58] Field of Search ..................... 351/153, 41, 121; D16/118, 117, 111; 16/228

[56] References Cited

U.S. PATENT DOCUMENTS

D. 232,262  7/1974  Bloch .............................. D16/118
4,222,640  9/1980  Bononi .

FOREIGN PATENT DOCUMENTS 548599  9/1956  Italy .
574377  1/1946  United Kingdom .

Primary Examiner—Rodney B. Bovernick
Assistant Examiner—Jay P. Ryan

[57] ABSTRACT

A clip body having a pair of vertical tabs, arranged in parallel facing relationship and having a transverse pin is employed as an attachment member for a temple bracket or hinge bracket connecting an earpiece to a plastic eyeglass frame. The clip is molded in situ together with the formation of the plastic frame, so that the plastic material embeds the clip and especially the pin.

1 Claim, 1 Drawing Sheet

PLASTIC EYEGLASS FRAMES

BACKGROUND OF THE INVENTION

The present invention relates to plastic eyeglass frames having hinged earpieces, and in particular to plastic eyeglass frames having an improved hinge connection between the plastic frames and the earpieces.

The attachment of hinged earpieces to plastic frames is difficult and there are several disadvantages which arise in the manufacturing process. In practice, the hinge pieces are attached by bolt or pin, stamped or forced through the rim of the plastic frame after the frame has been molded. As a result, the bolt or pin of the hinge piece frequently breaks off or damages the plastic rim. Ultimately, the hinge piece loosens and then breaks off after only a relatively short period of use and must be replaced with great difficulty.

It is also desirable to provide eyeglass frame assemblies in which the frame is formed of a molded plastic and a metallic temple portion to which the earpiece is attached. Such assemblies should provide a rigid frame for holding the lenses while also providing stronger temple and side pieces. In addition, the use of the two diverse materials enable the formation of frame assemblies of pleasing and fashionable design.

These constructions, however, suffer from the same defect as in frame assemblies where earpieces are attached directly to the frame, in that, the stamping or insertion of the retaining pin or bolt by which the temple piece is held, damages the rim or is not sufficiently strong over a long period of use.

It is an object of the present invention to provide plastic eyeglass frames with attached earpiece assemblies overcoming the disadvantages of the prior art.

It is a particular object of the present invention to provide an eyeglass frame assembly having plastic frame and temple pieces in which the attachment between the two is rugged and strong and provides a long lasting life.

It is another object of the present invention to provide an eyeglass frame assembly having plastic rims and metal temple pieces in which the temple pieces are attached to the plastic rims simultaneously with the molding of the rims and are at least partially embedded in the plastic during the molding process, to provide an integral attachment therewith.

These objects, as well as other objects and advantages will be apparent from the following disclosure of the present invention.

SUMMARY OF THE INVENTION

In accordance with the present invention a plastic eyeglass frame assembly to which is hinged an earpiece is provided with attachment means for the earpiece which is integrally embedded in the plastic during the molding of the frame.

Preferably, the attachment means is an integral part of a temple piece and comprises a U-shaped clip body having a pair of vertical, spaced apart cooperating tabs, in facing relation to each other. A pin extends in spanning relation between the tabs to hold the tabs from diverging and to form a channel between the pin and the base of the clip, so that when the frame is molded the plastic construction material extends through the channel and embeds the pin to thereby integrally interconnect the temple pieces to the plastic frame.

Preferably, the temple piece is metallic and formed in the shape of a V having a pair of free arms, at the ends of which are attached a clip body, respectively, and to the apex of which a hinge for connecting the earpiece is secured. Preferably, the clips are aligned so that the channel in each is in vertical alignment with the other.

Full details of the present invention are set forth in the following disclosure and are illustrated in the accompanying drawings.

DESCRIPTION OF THE INVENTION

Figure 1:
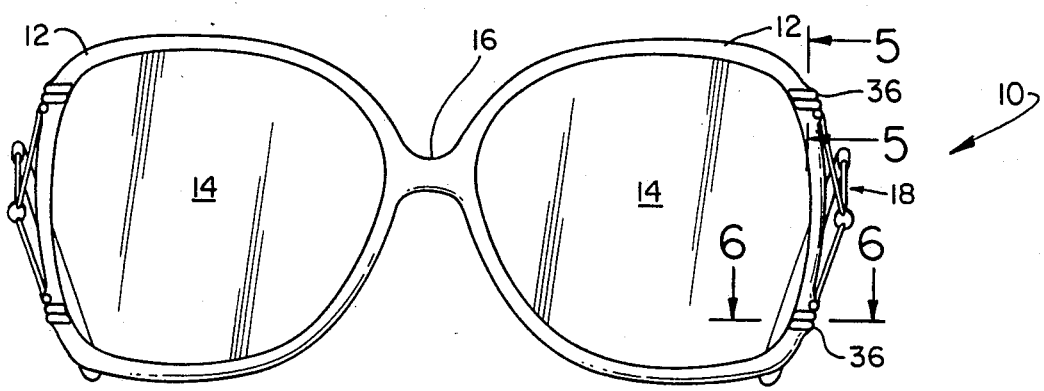
FIG. 1 is a front elevational view of the eyeglass frame assembly embodying the present invention.
Figure 2:
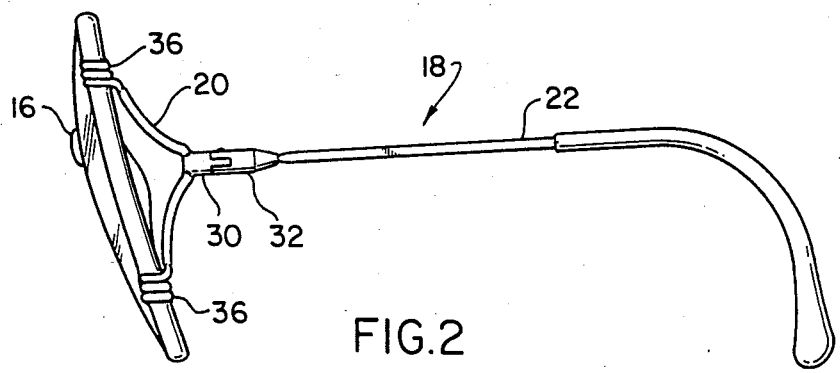
FIG. 2 is a side view of the frame assembly shown in FIG. 1.

The eyeglass frame assembly according to the present invention, as illustrated in FIGS. 1 and 2 constitutes a frame generally depicted by the numeral 10, comprising a pair of rims 12 in each of which is held a glass or plastic lens 14. The lens rims 12 are connected by a nose bridge 16 and each is connected to a temple piece 18 at its outer side, to which is attached a hinge-bracket assembly 20 having a rearwardly extending earpiece 22. The lens rims 12 and bridge 16 are formed as a single unitary member of molded plastic. The molding process, and the plastic material can be selected from any of the numerous processes and materials presently common in this art, neither of which requires significant modification for adaptation to the present invention.

Figure 4:
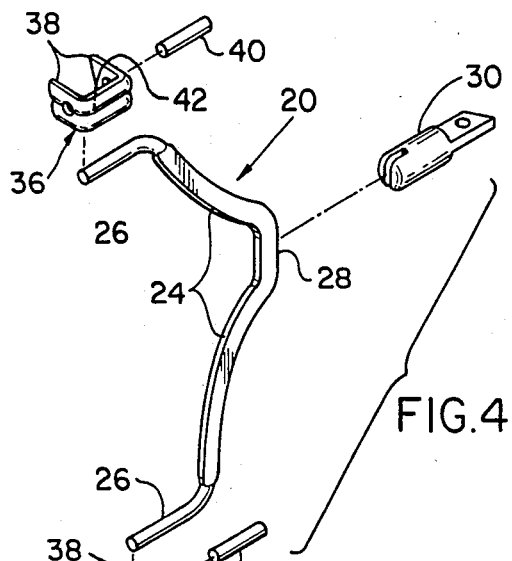
FIG. 4 is an exploded isometric view of the temple piece shown in FIG. 3.
Figure 3:
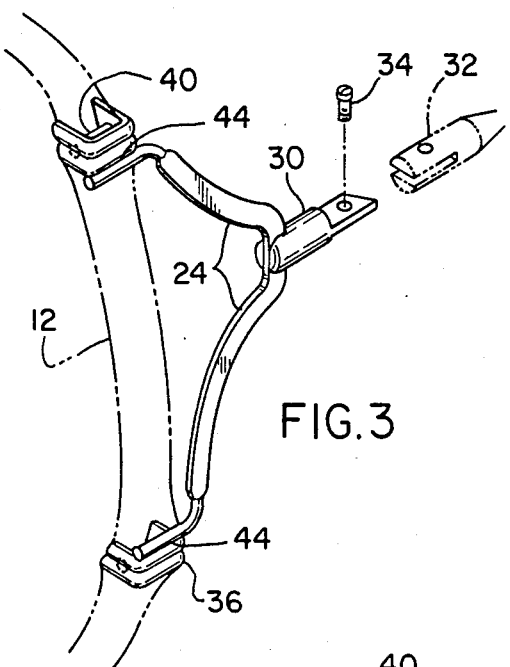
FIG. 3 is a partial isometric view of the frame assembly illustrating the temple piece in detail.

As seen in detail in FIGS. 3 and 4, each bracket assembly 20 comprises a V-shaped bracket 24 having a pair of angularly extending arms 26, the ends of which are spaced from each other in a common plane. Attached to the apex 28 of the temple bracket 24 is a blade type hinge member 30 to which is pivotally secured the cooperating female hinge member 32 secured at the end of the earpiece 22. The male and female hinge members 30 and 32 are held together by a removable hinge screw 34.

The free ends of each of the temple bracket arms 26 are integrally attached to a U-shaped metallic clip body 36 having a pair of tabs 38. The tabs 38 extend in parallel facing relationship to each other, so that, as seen in the figures, they fit about the exposed surfaces of the lens supporting rim 12, one being in a position adjacent the upper edge and the other being adjacent the lower edge of the outer side of the respective rim. An anchor pin 40 is set through holes in the tabs of each of the U-shaped clip bodies 36 approximately midway of its length, so that, as seen in the drawings, a channel 42 is formed between the clip and the pin 40 through which the plastic material may flow during molding, about the pin.

Preferably, the upper and lower clip bodies 36 of each temple bracket 20 are spaced sufficiently wide apart, so as to provide maximum rigidity and strength to the temple piece. In general, the upper and lower clip bodies 36 should be arranged, so that the channels 42 formed therein are as close as possible, in vertical registration with each other, depending upon the nature of the frame design. In any event, the pins 40 of each clip 38 should be parallel to each other, and transverse to the plane of the rims 12.

The temple pieces 18 are preferably made of metal, or plastic, or a combination of both. In the embodiment illustrated, arms 26 of the temple piece 18 are formed of a rigid round metallic wire and are welded to the exterior of the metal clip body 36, respectively, as illustrated in FIG. 3 at 44. The round metallic wire is, in part, flattened along its length, and particularly at the apex 28 of the bracket 24, to permit easy welding to it of the hinge bracket 30. The flattened section may be easily coated with a decorative plastic or other material. The round wire end of the bracket 24 may, if desired, be inserted in a hole piercing the clip body and thereafter weld or otherwise secured in place.

Figure 5:
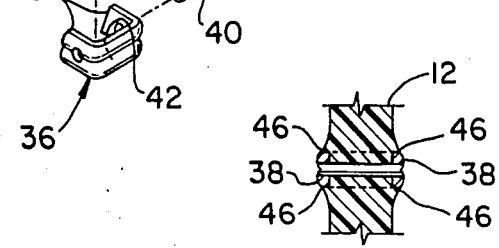
FIG. 5 is a sectional view taken along lines 5—5 of FIG. 1.
Figure 6:
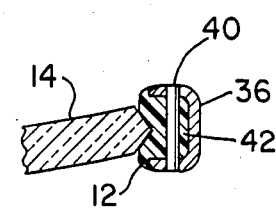
FIG. 6 is a sectional view taken along lines 6—6 of FIG. 1.

According to the present invention, the clip bodies 36 are attached to the lens supporting rims 12 simultaneously with the molding of the rims, the clip bodies 36 being held in the mold in conventional manner as the frame 10 is formed. Thus, the plastic material flows within the channel 42 so as to surround the anchor pin 40 and embed the anchor pin 40 and the body clip 36, at least partially, in the flowing plastic material which when cured integrally secures the clip body to the rims 16. The plastic material further forms a fillet 46 (FIG. 5) curving outward to increase the outer thickness of the rim adjacent the narrow exterior edges of the clip 36, and the plastic material flows smoothly to the surface of the clip 36.

The anchor pin 40 may be merely set within the tabs 38 of the U-shaped clip body 36 prior to the molding step although it is preferred that it be welded or brazed into place so that it forms a unitary sub-assembly with the clip body 36 preventing the tabs from moving apart from each other. In any event, the ends of the anchor pin 40 are dressed so as to blend with the contours of the surface of the clip body 36, and the clip may be plated, if desired, or merely polished. The metal from which the temple plate and clip are formed can be selected from any one of the metals currently being used in eyeglass assemblies. Gold, silver or the like are quite suitable.

While the clip attachment means of the invention is shown in combination with a relatively large temple piece having two arms, it will be recognized that it is also possible to apply the invention with a single armed temple piece or even without a temple piece and only with the hinge bracket. The use of a clip, having a pair of parallel facing tabs and a transverse pin insures rigidity and lasting strength even to other forms of temple members and hinge assemblies than that actually illustrated.

Since various modifications, changes and the like have been described, and other modifications and changes will be obvious to those skilled in the art, it is intended that the present disclosure be taken as illustrative only, and not as limiting the scope of the invention.

What is claimed is:

1. An improved plastic eyeglass frame of the type having a pair of earpieces hingedly connected at opposite sides thereof, said improvement comprising a temple piece disposed at the higned end of each earpiece and being in the form of a V-shaped metallic bracket with the earpiece being hingedly connected to the apex thereof, said temple piece having a pair of vertically spaced upper and lower U-shaped clip bodies that are each integrally attached to a respective free end of said V-shaped bracket and aligned in substantial vertical registration, said clip bodies defined by a pair of cooperating tabs in facing relation to each other, at least one pin integrally connected in spanning relation between each of said pair of tabs to form a channel bounded by said hinge body, tabs and pin, said channel, in top view, being of a substantially elongate rectangular configuration, and a plastic frame having material thereof molded through said channel and forming fillets adjacent the exterior edges of each of said clip bodies thereby integrally to interconnect said temple piece to said plastic frame.

* * * * *